Feb. 10, 1970     S. G. POTRZUSKI     3,494,067

COLLECTING CONTAINER FOR ENTOMOLOGICAL AND AQUATIC SPECIMENS

Filed Oct. 5, 1967

STANLEY G. POTRZUSKI
INVENTOR

BY Walter G. Finch
ATTORNEY

United States Patent Office 3,494,067
Patented Feb. 10, 1970

3,494,067
COLLECTING CONTAINER FOR ENTOMOLOGI-
CAL AND AQUATIC SPECIMENS
Stanley G. Potrzuski, 452 Elrino St.,
Baltimore, Md. 21224
Filed Oct. 5, 1967, Ser. No. 673,107
Int. Cl. A01m 3/00
U.S. Cl. 43—134                                           8 Claims

ABSTRACT OF THE DISCLOSURE

A collecting container for entomological specimens is disclosed which features a fast acting trap door. The cover of an inverted plastic or glass jar is provided with an aperture and a pair of opposing side slits. A valve strip extends through the slits across the aperture inside of the cover and terminates on the outside of the jar in a half-loop having resilient bias against the side of the jar.

The jar is carried (inverted) grasped in the downward cupped hand. When the forefinger is pressed against the bias loop of the valve strip, the latter is forced to slide further into the jar. An aperture in the strip is located so as to thereupon register with the aperture of the cover and provide a door through which the specimen is introduced. The release of forefinger pressure quickly closes the door as the apertures move out of register.

---

This invention relates generally to receptacles, and more particularly it pertains to a jar with a trap door arrangement for capturing and retaining entomological and aquatic specimens.

It is common practice to capture a specimen by quickly slipping an inverted jar over the same but it often happens that before the jar is capped the captive escapes.

It is an object of this invention, therefore, to provide a jar arrangement with a fast-acting trap door which is conveniently operated by the forefinger of the operator.

Another object of this invention is to provide a simple, effective access port arrangement of low cost for use on any receptacle.

Still another object of this invention is to provide a sliding trap door which provides its own spring return action.

Other objects and attendant advantages of this invention will become more readily apparent and understood from the following detailed specification and accompanying single sheet of drawings in which.

Figure 1:
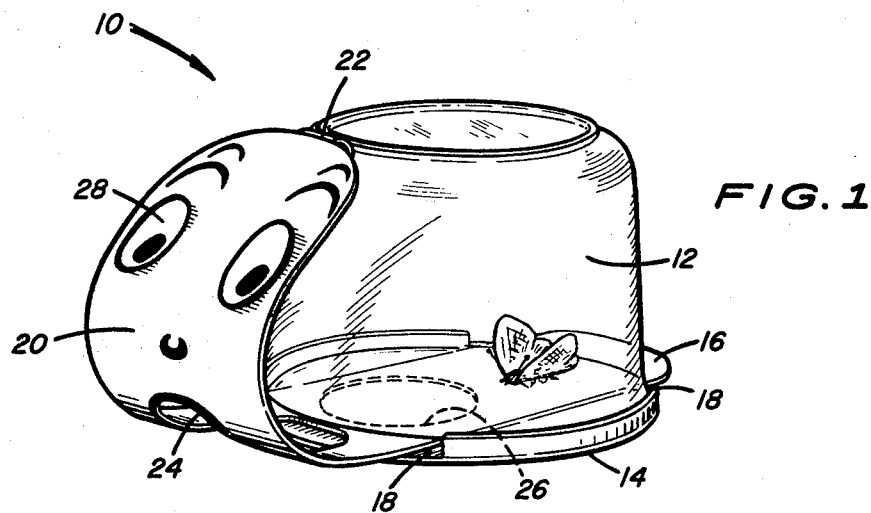
FIG. 1 is a general perspective view of a receptacle incorporating features of this invention.

Referring now to the details of the invention as shown in the drawings, reference numeral 10 indicates generally a novel specimen receptacle. This receptacle 10 consists of a transparent glass or plastic container 12 with a screw-on or press-fit cover 14.

The cover 14 slidably retains an elongated trap door strip 16 against its innerface by means of diametrically opposite slots 18 cut into its sides. This trap door strip 16 extends beyond the cover 14 at both sides, one of the ends terminating in a resilient flexed portion 20 which curves back to contact the container 12. At this point it is attached thereto by a flexible hinge 22.

Figure 2:
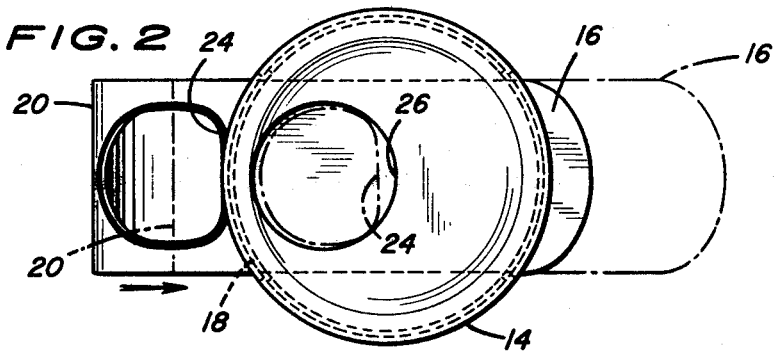
FIG. 2 is a bottom view of the trap door representing the action thereof in dot-dash lines with the receptacle being depicted in phantom.
Figure 3:
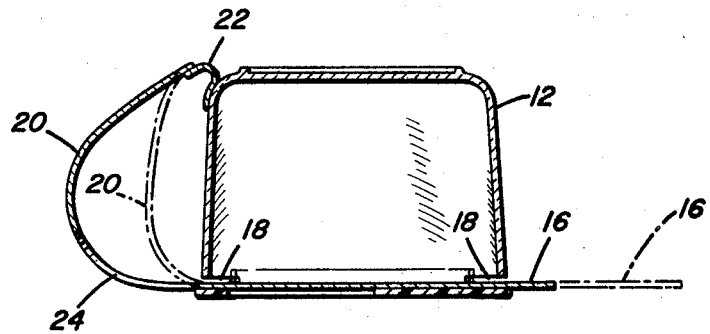
FIG. 3 is a vertical section of the receptacle arrangement, with the open trap door position being shown in dot-dash lines.

An aperture 24 is provided in the strip 16 and a similar aperture 26 is formed in the face of the cover 14. When the forefinger of the operator presses against the flexed portion 20, the aperture 24 moves into the container 12 through the slot 18 and registers with the aperture 26 of the cover 14, as shown by the arrow and dot-dashed lines of FIG. 2. Thus the receptacle 10 may be brought down upon a specimen which enters through the resulting opening. A release of forefinger pressure allows the resilient flexed portion 20 to resume its former shape, with the aperture 24 being withdrawn from registry with the cover aperture 26 to complete the capture.

The chance of frightening the specimen is avoided and the visibility increased if the cover 14 and trap door strip 16 are of transparent material. A fanciful figure 28 as shown in FIG. 1 may be printed upon the flexed portion 20 to appeal to children.

If desired, instead of utilizing a screw-on or press-fit cover 14, the bottom of the receptacle can be designed of hemispherical shape having a rim with parallel arranged slots, similar to slots 18, provided in the rim for receiving a strip similar to strip 16, in order to eliminate the use of cover 14.

Obviously many modifications and variations of the present invention are possible in light of the above teachings. It is, therefore, to be understood that the invention may be practiced otherwise than as specifically described.

What is claimed is:

1. A trapping and collecting container for entomological and aquatic specimens comprising:
   a housing having a base portion with an opening therein,
   a pair of opposing side slits defined in said housing adjacent said base portion,
   strip means slidably mounted in said pair of opposing side slits and extending outwardly from said housing at one of said side slits with an opening defined in said strip means, and
   biasing means interconnecting said strip means and said housing for biasing said strip releasably in a first position wherein said opening in said strip means is in misalignment with said opening in said base portion thereby to close the housing, and permitting sliding movement of said strip means against the biasing of said biasing means to a second position, wherein said openings in said strip means and said base portion are in axial alignment thereby to provide an opening to the interior of said housing.

2. A trapping and collecting container as set forth in claim 1, wherein saids trip means comprises a relatively thin sheet of flexible resilient material.

3. A trapping and collecting container as set forth in claim 2, wherein said strip means extends outwardly of said housing at said one of said side slits when said strip is in said first position to provide a curvilinear portion thereof arcuately projecting away from said base portion and wherein at least one portion of said opening in said strip means is provided in the curvilinear portion thereof.

4. A trapping and collecting container as set forth in claim 1 wherein said strip means includes means for preventing the end portions of said strip means from disengagement with said housing.

5. A trapping and collecting container as set forth in claim 1 wherein said housing and said strip means are of substantially transparent plastic material.

6. A trapping and collecting container as set forth in claim 1 wherein said container is in the form of a fanciful configuration of a creature.

7. A trapping and collecting container as set forth in claim 2 wherein said base portion has a lateral extent at least as great as the maximum lateral extent of said housing above said base portion, and said opening therein is substantially smaller than said maximum lateral extent of the housing.

8. A trapping and collecting container as set forth in claim 2 wherein said housing includes a downwardly opening upper portion and said base portion comprises a cover member removably mounted to the bottom of said upper portion, each of said upper portion and cover member being provided with openings cooperatively defining said slit.

References Cited

UNITED STATES PATENTS

| | | | |
|---|---|---|---|
| D. 199,067 | 9/1964 | Laberge | D31—3 |
| 1,249,289 | 12/1917 | Bigoney | 222—511 |
| 1,750,163 | 3/1930 | Disney | 119—134 |
| 2,620,098 | 12/1952 | Kinley | 222—511 |
| 2,626,089 | 1/1953 | Osfar | 222—511 |
| 3,181,268 | 5/1965 | De Forest | 43—110 |

ALDRICH F. MEDBERY, Primary Examiner

U.S. Cl. X.R.

43—110